(No Model.) 2 Sheets—Sheet 1.

C. ST. CHARLES.
ORE SEPARATOR.

No. 283,296. Patented Aug. 14, 1883.

WITNESSES:
Otto Irufeland
William Miller

INVENTOR
Charles St. Charles
BY Van Santvoord & Hauff
ATTORNEYS (No Model.) 2 Sheets—Sheet 2.

C. ST. CHARLES.
ORE SEPARATOR.

No. 283,296. Patented Aug. 14, 1883.

WITNESSES:
Otto Hufeland
William Miller

INVENTOR
Charles St. Charles
BY Van Santvoord & Hauff,
ATTORNEYS

N. PETERS. Photo-Lithographer. Washington, D. C.

UNITED STATES PATENT OFFICE.

CHARLES ST. CHARLES, OF NEW YORK, N. Y.

ORE-SEPARATOR.

SPECIFICATION forming part of Letters Patent No. 283,296, dated August 14, 1883.

Application filed December 4, 1882. (No model.)

*To all whom it may concern:*

Be it known that I, CHARLES ST. CHARLES, a citizen of the United States, residing at New York, in the county and State of New York, have invented new and useful Improvements in Ore-Separators, of which the following is a specification.

This invention relates to an ore-separator which is of a simple and novel construction, and which is intended to be used more particularly on the wet principle, or together with water, but which in certain emergencies may also be used dry, or without water.

The peculiar construction of my separator is pointed out in the following specification and illustrated in the accompanying drawings, in which—

Figure 1:
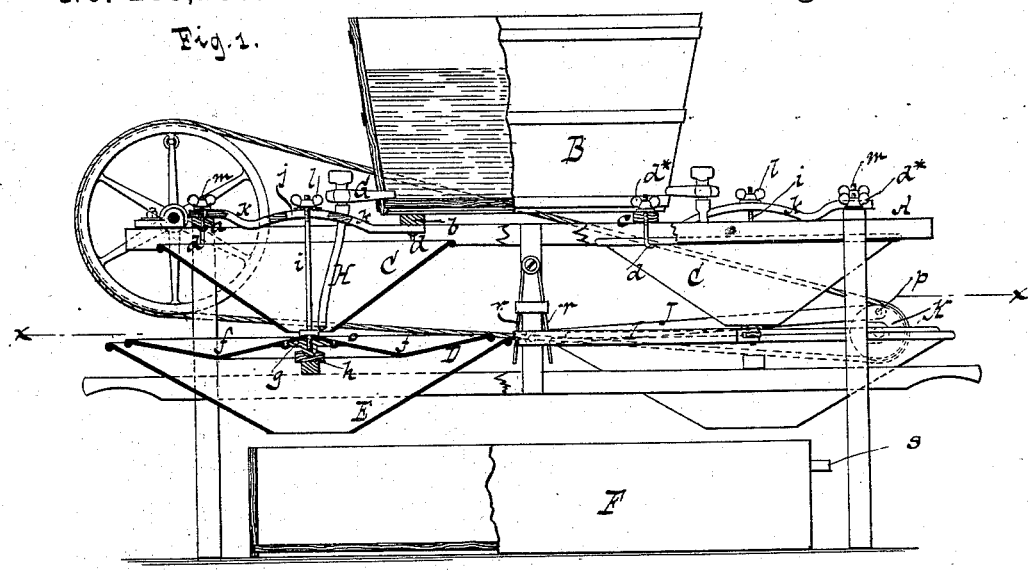
Figure 2:
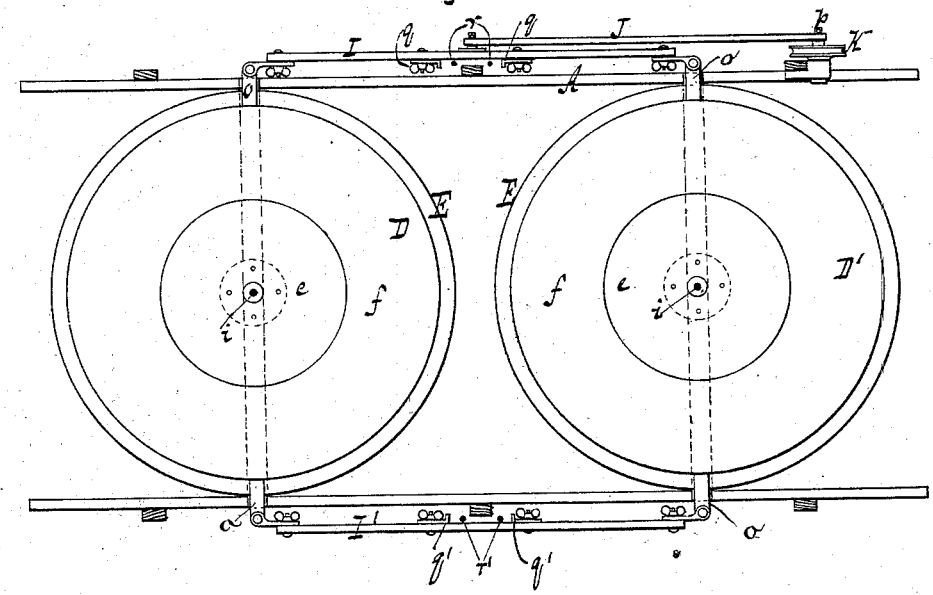
Figure 3:
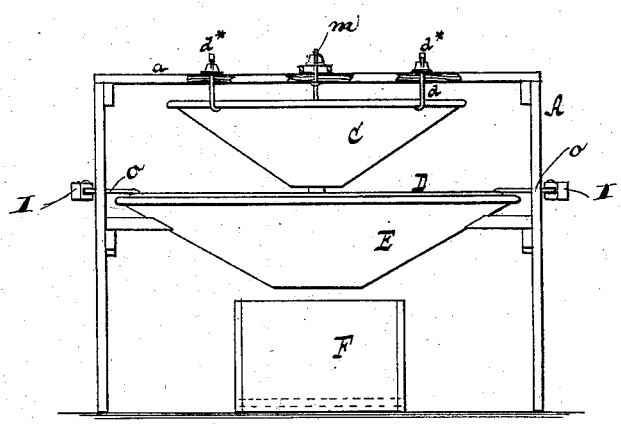
Figure 4:
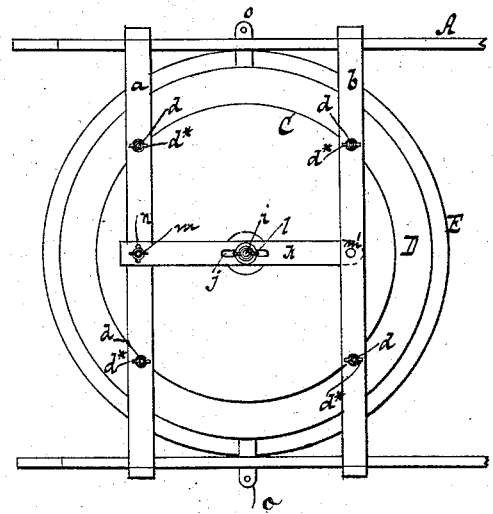

Figure 1 represents a side elevation, partly in section. Fig. 2 is a horizontal section in the plane $x$ $x$, Fig. 1. Fig. 3 is an end view, partly in section. Fig. 4 is a plan or top view when the water-tank is left off.

Similar letters indicate corresponding parts.

In the drawings, the letter A designates a frame which supports the working parts of my separator. This frame may be made of any suitable material; but I prefer to make it of wood and to fasten its various parts together, so that it can be readily taken apart and moved from place to place with convenience. On the traverses $b$ $c$ of this frame is placed the water-tank B, and beneath the traverses $a$ $b$ is situated the hopper C, which is provided at its bottom with a central discharge-opening, and is supported by hooks $d$, the shanks of which pass through the traverses, and are provided with screw-threads and nuts $d^*$, so that the hopper may be adjusted up or down, as may be required. Beneath the hopper is situated the pan D. This pan is formed with a raised center, $e$, the sides of which slope down into an annular trough, $f$, and it rests on a hemispherical step, $g$, which is firmly secured in its center, and has its bearings in a corresponding hemispherical socket, $h$. The step $g$ is firmly secured to the bottom of the pan, and from it rises a rod, $i$, which extends through a slot, $j$, in a bridge, $k$, and is adjusted by means of a nut, $l$. The bridge $k$ is pivoted at one end to the traverse $b$ by a pivot, $m'$, while its other end is provided with a transverse slot, $n$, through which projects a bolt secured to the traverse $a$, and provided at its upper end with a screw-bolt, $m$, the construction being such that the pan can be adjusted in an upright or in an inclined position. If the pan be in an upright position, as shown in Fig. 1, the rod $i$ will also be upright, and if said rod be moved in the slot $j$, it becomes oblique or inclined, and the pan, being fast to the rod, is also brought in an inclined position. By swinging the bridge $k$ on its pivot $m'$ when the rod $i$ is upright, said rod, together with the pan, can also be adjusted either in an inclined or to an upright position. Beneath the pan D is situated a cone-shaped cup E, which is open at the bottom, so that the water, which discharges over the rim of the pan, passes down into the reservoir E.

In the water-tank B, near its bottom, is secured a faucet, G, from which extends a flexible pipe, H, down through the hopper C, so that when the faucet is opened the water, flowing from the tank, discharges at a point on a level, or nearly so, with the discharge-opening of the hopper. By these means the mass of pulverized ore and earthy matter which is fed into said hopper is prevented from clogging, and a uniform discharge can be effected.

An oscillating motion is imparted to the pan by the following mechanism: From the edge of the pan extends a lug, $o$, to which is attached a rod, I, which connects by a rod, J, with an eccentric wrist-pin, $p$, secured in the face of a pulley, K, to which a revolving motion is imparted by hand or any other suitable power. On the rod I are secured two stops, $q$ $q$, which act on a spring, $r$, so that the momentum of the pan is checked, and the operation of reversing the motion of the pan is effected without disagreeable shocks.

Instead of using two stops, $q$ $q$, a single stop may be placed between the shanks of the spring $r$. In the example represented by the drawings I have shown two pans, D D', which are connected by the rod I, and receive an oscillating motion from the pulley K, and in order to equalize the motion and preserve a uniform strain of the steps of the pans, an additional rod, I', is applied on the side opposite to that occupied by the rod I, said rod I' being provided with stops $q'$ $q'$ and a recoil-spring, $r'$, in the same manner as the rod I. If desired, the number of pans may be increased, and an oscillating motion may be imparted to all the pans by elongating the rods I I' and connecting them to the several pans in the series. It is obvious that the mechanism for oscillating the pan or pans may be changed in various ways, and I do not wish to confine myself to the precise means shown in the drawings.

By raising or lowering the hopper the discharge-channel formed between the lower edge of the hopper and the raised center of the pan can be increased or diminished. The mass on being gradually discharged from the hopper runs down uniformly over the sides of the raised center, and by the oscillating motion imparted to the pan the heavy particles are caused to settle in the annular trough of the pan, while the light portions are carried off by the water over the outer edge of the pan, whence they pass down into the reservoir F. In this reservoir the heavy particles subside, and the water runs off through the overflow-pipes s. After a certain time the mass which has accumulated in the reservoir may be returned to the hopper and subjected to an additional separation. In localities where no water can be obtained the pulverized ore may be fed to the hopper in a dry state, and a partial separation can be effected by the oscillating motion of the pan. By adjusting the pan in an oblique position the proportion of the mass which discharges over the edge of the pan is increased, and when the mass fed to the hopper contains only a small percentage of precious metals such adjustment may be recommended.

What I claim as new, and desire to secure by Letters Patent, is—

1. In an ore-washer, the combination of a supporting frame-work, an ore-receiving hopper suspended therefrom and having at its bottom a central discharge-opening, a water-tank supported by the frame, a pipe extending from the tank down through the hopper and having its lower end terminated on a level, or substantially so, with the central discharge-opening of the hopper, and a pan located beneath the hopper and receiving the ore and water therefrom, substantially as described.

2. In an ore-washer, the combination of a supporting-frame, a hopper suspended therefrom and having a central discharge-opening, a water-tank, a pipe leading therefrom into the hopper, a pan suspended beneath the hopper and having an elevated center and an annular trough, said elevated center being in close proximity to the central discharge-opening of the hopper, mechanism for oscillating the pan, and a cup supported under the pan to receive the light particles of the ore and the water which are carried over the edges of the pan, substantially as described.

3. The combination of the suspended hopper having a central discharge-opening, the pan located beneath the hopper, and provided with an elevated center and annular trough, and mechanism for adjusting the discharge-opening of the hopper relative to the elevated center of the pan and holding it in a fixed position when adjusted, substantially as described.

4. The combination, substantially as hereinbefore described, with the pan, of the hemispherical step on which the pan oscillates, and means, substantially such as described, for adjusting the pan both in an upright and in an inclined position, as set forth.

5. The combination of two ore-receiving pans, rods connecting the two pans together at opposite sides thereof, a crank or wrist pin, a rod connecting the crank or pin with one of the rods connecting the pans, and a recoil-spring, substantially as described.

In testimony whereof I have hereunto set my hand and seal in the presence of two subscribing witnesses.

CHARLES ST. CHARLES. [L. S.]

Witnesses:
W. HAUFF,
E. F. KASTENHUBER.